T. H. Bonham,
Portable Fountain,
N°. 54,494.    Patented May 8, 1866.
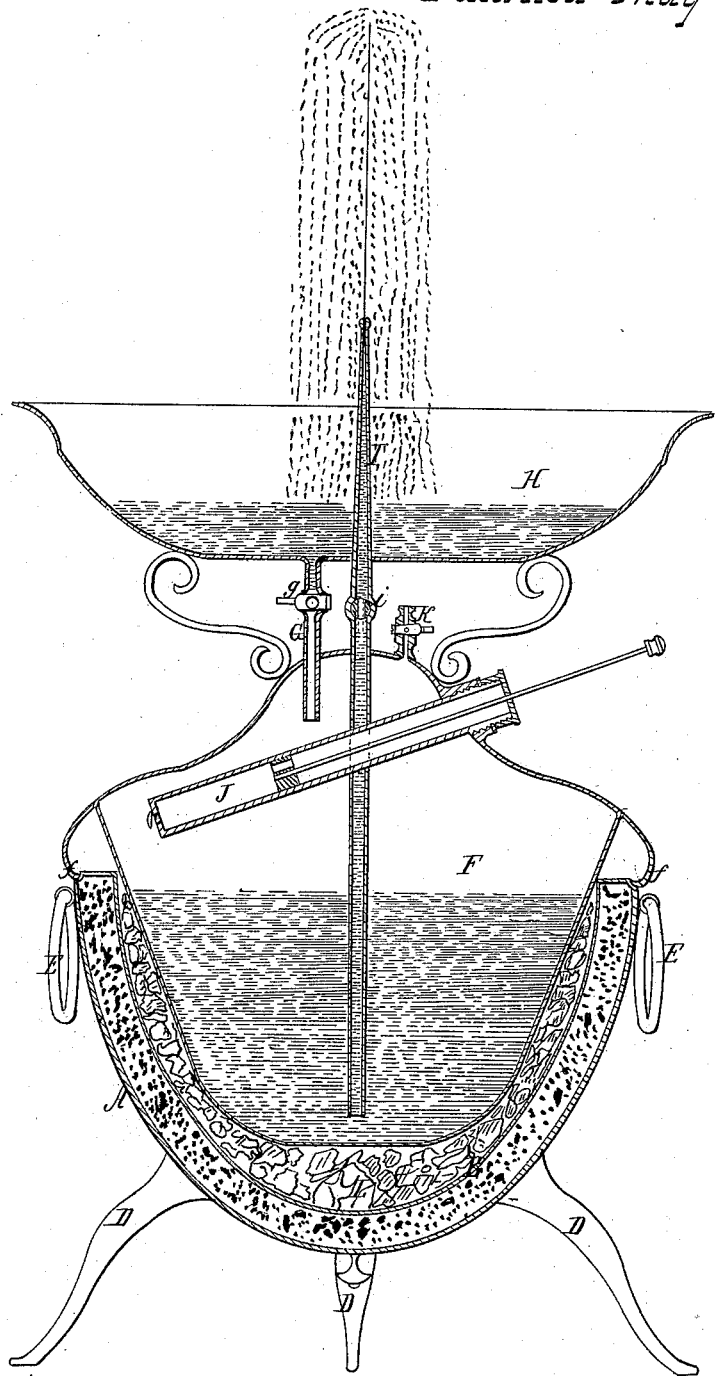
Witnesses;    Inventor;

UNITED STATES PATENT OFFICE.

THOMAS H. BONHAM, OF ELIZABETHTOWN, OHIO.

IMPROVEMENT IN PORTABLE FOUNTAINS.

Specification forming part of Letters Patent No. 54,494, dated May 8, 1866.

*To all whom it may concern:*

Be it known that I, THOMAS H. BONHAM, of Elizabethtown, Hamilton county, Ohio, have invented a new and useful Portable Fountain; and I do hereby declare the following to be a full, clear, and exact description thereof, reference being had to the accompanying drawings, making part of this specification.

This invention relates to a fountain adapted to be moved about from place to place and set upon a stand, table, or other convenient object.

In the accompanying axial section, A B are two bowl-shaped vessels, secured one within the other so as to leave between them an annular space or jacket, C, which is filled with charcoal or other non-conductor. This vessel A B C, called the "refrigerator," is provided with suitable feet D and handles E.

F is a hermetically-closed reservoir for water, having a rim, $f$, which fits snugly to that of the refrigerator, having also a feeder, G, through which the water is supplied to it, and through which water from the basin is allowed to flow back to it. The feeder G is closed and opened by means of a cock, $g$, or a stopper.

H is a dish or basin supported upon the reservoir. I is a nozzle, which extends upward from the top of the reservoir and through the bottom of the basin. $i$ is a cock for opening and closing said nozzle. J is a pump for forcing air into the reservoir. K is a vent-cock for liberating air from the reservoir. The space L is left between the reservoir and the refrigerator for the insertion of ice.

Operation: The reservoir having been about half filled with water and the space L with ice, and the cocks $g$, $i$, and K closed, the pump J is worked until the desired pressure has been obtained upon the surface of the water in the reservoir. The instrument is now ready for use, and may be set away until wanted. When it is desired for the fountain to play the cock $i$ is opened and water then issues from the mouth of the nozzle I in form of a jet.

Instead of the pump, there may be simply a provision for applying a pump, and closable with a suitable cap or stopper; or a bellows may be used instead of a pump.

I am aware that portable hydrostatic and pneumatic fountains have before been used, and therefore do not claim such an invention, broadly; neither do I claim novelty in my refrigerating devices irrespectively of their combination with my portable fountain; but

I claim herein as new and of my invention—

The arrangement of non-conducting refrigerator A B C, reservoir F, feeder G $g$, pan H, and nozzle I $i$, the whole forming a portable fountain, substantially as described.

In testimony of which invention I hereunto set my hand.

THOMAS H. BONHAM.

Witnesses:
GEO. D. KNIGHT,
JAMES H. LAYMAN.